(12) United States Patent
Kwant (10) Patent No.: US 11,670,094 B2
(45) Date of Patent: *Jun. 6, 2023

(54) USING RASTERIZATION TO IDENTIFY TRAFFIC SIGNAL DEVICES

(71) Applicant: Ford Global Technologies, LLC, Dearborn, MI (US)

(72) Inventor: Richard L. Kwant, San Bruno, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,666

(22) Filed: Dec. 10, 2021

(65) Prior Publication Data

US 2022/0101071 A1  Mar. 31, 2022

Related U.S. Application Data

(63) Continuation of application No. 16/817,708, filed on Mar. 13, 2020, now Pat. No. 11,210,571.

(51) Int. Cl.
*G06V 20/58* (2022.01)
*G06N 3/08* (2023.01)
(Continued)

(52) U.S. Cl.
CPC .......... *G06V 20/584* (2022.01); *G06F 18/214* (2023.01); *G06F 18/25* (2023.01); *G06N 3/08* (2013.01)

(58) Field of Classification Search
None
See application file for complete search history.

(56) References Cited

U.S. PATENT DOCUMENTS 7,630,807 B2 12/2009 Yoshimura et al.
8,762,006 B2 6/2014 Miller
(Continued)

FOREIGN PATENT DOCUMENTS

CN 106909937 A 6/2017
CN 108304813 A 7/2018
(Continued)

OTHER PUBLICATIONS

Cui, R. et al. "Multimodal Trajectory Predictions for Autonomous Driving Using Deep Convolutional Networks," In 2019 International Conference on Robotics and Automation (ICRA), May 20, 2019, pp. 2090-2096.

(Continued)

*Primary Examiner* — Leon Flores
(74) *Attorney, Agent, or Firm* — Frank MacKenzie; Brooks Kushman P.C.

(57) ABSTRACT

Systems and methods are provided for identifying and representing a traffic signal device. The method includes determining a location and orientation of the vehicle and receiving a real world image. The method further includes analyzing information about the vehicle's location and environment and using this information and the vehicle's orientation to generate a raster image illustrating an approximation of a view of the real world image, including one or more traffic signal devices. Additionally, the method includes providing the real world image and the raster image as inputs to a neural network to classify a traffic signal device in the real world image as the primary traffic signal device and determine a set of coordinates indicating a location of the primary traffic signal device, generating a classified real world image which includes a bounding box indicating the set of coordinates, and receiving the classified real world image.

20 Claims, 5 Drawing Sheets

(51) Int. Cl.
*G06F 18/25* (2023.01)
*G06F 18/214* (2023.01)

(56) References Cited

U.S. PATENT DOCUMENTS

| | | | |
|---|---|---|---|
| 9,014,905 | B1 | 4/2015 | Kretzschmar et al. |
| 9,368,026 | B1 | 6/2016 | Herbach et al. |
| 9,542,846 | B2 | 1/2017 | Zeng et al. |
| 9,604,585 | B2 | 3/2017 | Joyce et al. |
| 9,740,178 | B2 | 8/2017 | Debouk et al. |
| 9,862,364 | B2 | 1/2018 | Fairfield |
| 9,892,332 | B1 | 2/2018 | Wendel et al. |
| 10,061,313 | B2 | 8/2018 | Letwin et al. |
| 10,136,026 | B2 | 11/2018 | Kanai |
| 10,303,960 | B2 | 5/2019 | Hattori et al. |
| 10,325,166 | B2 | 6/2019 | Kwant et al. |
| 10,325,373 | B2 | 6/2019 | Kwant et al. |
| 10,339,669 | B2 | 7/2019 | Kwant et al. |
| 11,210,571 | B2 * | 12/2021 | Kwant ............... G06V 20/584 |
| 2007/0150196 | A1 | 6/2007 | Grimm |
| 2009/0060273 | A1 | 3/2009 | Stephan et al. |
| 2009/0174573 | A1 | 7/2009 | Smith |
| 2016/0252905 | A1 | 9/2016 | Tian et al. |
| 2018/0112997 | A1 | 4/2018 | Fasola et al. |
| 2018/0373980 | A1 | 12/2018 | Huval |
| 2019/0012551 | A1 | 1/2019 | Fung et al. |
| 2019/0122059 | A1 * | 4/2019 | Zhou ..................... G06V 10/56 |
| 2019/0340450 | A1 | 11/2019 | Moosaei et al. |
| 2020/0086879 | A1 | 3/2020 | Lakshmi Narayanan et al. |
| 2020/0108806 | A1 | 4/2020 | Ben Shalom |
| 2020/0134379 | A1 | 4/2020 | Gaidon et al. |
| 2020/0160699 | A1 | 5/2020 | Annapureddy et al. |

FOREIGN PATENT DOCUMENTS

| | | |
|---|---|---|
| WO | 2018009552 A1 | 1/2018 |
| WO | 20180201835 A1 | 11/2018 |
| WO | 20180223882 A1 | 12/2018 |

OTHER PUBLICATIONS

International Search Report and Written Opinion dated Jun. 16, 2021, in Application No. PCT/US2021/021003.
Information about Related Patents and Patent Applications, see section 4 of the accompanying Information Disclosure Statement Letter, which concerns Related Patents and Patent Applications.

* cited by examiner

USING RASTERIZATION TO IDENTIFY TRAFFIC SIGNAL DEVICES

RELATED APPLICATION AND CLAIM OF PRIORITY

This patent document claims priority to, and is a continuation of, U.S. patent application Ser. No. 16/817,708, filed Mar. 13, 2020, which will grant Dec. 28, 2021 as U.S. Pat. No. 11,210,571.

BACKGROUND

The present disclosure relates to traffic signal device identification and, in particular, to using rasterization to identify traffic signal devices.

Traffic signal devices are critical to safe driving. They signal when it is the safe, legal, and appropriate time for vehicles to pass or enter certain intersections or other regions. For this reason, autonomous vehicles require the ability to accurately detect and classify traffic signal devices. This information is used to accurately instruct the autonomous vehicle as to which maneuvers are allowed by the vehicle.

Various techniques are available for identifying traffic signal devices. One such technique is the use of deep learning methods. Deep learning techniques and methods have the advantage of being largely data-driven and able to integrate information from a wide range of example images into a single classifier. While many architectures of deep learning models follow a common pattern of successive layers that reduce the dimensionality of an input image, the methods by which these models represent their inputs and outputs vary substantially.

Traffic signal devices may be detected using standard object detection techniques, and, in the field of self-driving or autonomous cars or other vehicles, deep neural networks are often used for object detection and classification. In a typical object detection task, a neural network is configured to locate an arbitrary number of objects in a scene. Since traffic signal devices are often mapped, at a particular location there may be some prior knowledge. Examples include what kinds or types of objects should be present in the scene and what their rough sizes are.

Viewing and isolating a traffic signal device is not necessarily a straight-forward process. Multiple traffic signal device faces may be visible from a particular location and angle, making it difficult to isolate which traffic signal device is the correct traffic signal device. Therefore, for at least these reasons, a better method of efficiently and accurately identifying and isolating a face of a correct traffic signal device is needed.

SUMMARY

According to an aspect of the present disclosure, a method for identifying and representing a traffic signal device is provided. The method includes, determining a location and orientation of a vehicle by a geographic location system of the vehicle and receiving a real world image that includes one or more traffic signal devices by an image sensor. The method further includes, by a processor, analyzing information about one or more features of an environment at the location of the vehicle, using the analyzed information and the orientation of the vehicle to generate a raster image of the environment, providing the real world image and the raster image as inputs to a neural network to classify one of the traffic signal devices in the real world image as a primary traffic signal device and determine a set of coordinates indicating a location of the primary traffic signal device in the real world image, generating a classified real world image which includes a bounding box indicating the determined set of coordinates, and receiving, from the neural network, the classified real world image. The raster image may be an approximation of a view of the real world image captured by the image sensor of the vehicle when positioned at the location and orientation of the vehicle, and the raster image may include one or more traffic signal devices that appear in the view, one of which being labeled as the primary traffic signal device.

According to various embodiments, the set of coordinates is a set of four coordinates in a two-dimensional plane.

According to various embodiments, the classified real world image further includes one or more sets of coordinates indicating a location of any secondary traffic signal devices in the real world image.

According to various embodiments, in the raster image, any secondary traffic signal devices are each represented by a mask corresponding to a location of the secondary traffic signal device.

According to various embodiments, the method further includes applying a color channel to each mask in the raster image, in which the color channel applied for each mask distinguishes the primary traffic signal device from each of the secondary traffic signal devices.

According to various embodiments, the bounding box indicates a discrete region of pixels in the classified real world image.

According to various embodiments, the geographic location system includes a Global Positioning System device.

According to another aspect of the present disclosure, a system for identifying and representing a traffic signal device is provided. The system includes a geographic location system of a vehicle configured to determine a location and orientation of a vehicle, a transceiver configured to send and receive digital information, and an image sensor configured to capture a real world image that includes one or more traffic signal devices. The system further includes a processor configured to analyze information about features of an environment at the location of the vehicle and the orientation of the vehicle to generate a raster image of the environment, provide, using the transceiver, the real world image and the raster image as inputs to a neural network to classify one of the traffic signal devices in the real world image as a primary traffic signal device and determine a set of coordinates indicating a location of the primary traffic signal device in the real world image, generate a classified real world image which includes a bounding box indicating the determined set of coordinates, and receive, from the neural network, the classified real world image. The raster image may be an approximation of a view of the real world image captured by the image sensor of the vehicle when positioned at the location and orientation of the vehicle, and the raster image may include one or more traffic signal devices that appear in the view, one of which labeled as the primary traffic signal device.

According to various embodiments, the set of coordinates is a set of four coordinates in a two-dimensional plane.

According to various embodiments, the classified real world image further includes one or more sets of coordinates indicating a location of any secondary traffic signal devices in the real world image.

According to various embodiments, in the raster image, any secondary traffic signal devices are each represented by a mask corresponding to a location of the secondary traffic signal device.

According to various embodiments, the processor is further configured to apply a color channel to each mask in the raster image, in which the color channel applied for each mask distinguishes the primary traffic signal device from each of the secondary traffic signal devices.

According to various embodiments, the bounding box indicates a discrete region of pixels in the classified real world image.

According to various embodiments, the geographic location system includes a Global Positioning System device.

According to yet another aspect of the present disclosure, a system for identifying and representing a traffic signal device is provided. The system includes a vehicle including a geographic location system configured to determine a location and orientation of the vehicle, an image sensor configured to receive a real world image that includes one or more traffic signal devices, and a computer-readable storage medium which includes one or more programming instructions. The one or more programming instructions, when executed, cause the vehicle to analyze information about one or more features of an environment at the location of the vehicle, generate a raster image of the environment using the analyzed information and the orientation of the vehicle, provide the real world image and the raster image as inputs to a neural network to classify one of the traffic signal devices in the real world image as a primary traffic signal device and determine a set of coordinates indicating a location of the primary traffic signal device in the real world image, generate a classified real world image which includes a bounding box indicating the determined set of coordinates, and receive, from the neural network, the classified real world image. The raster image may be an approximation of a view of the real world image captured by the image sensor of the vehicle when positioned at the location and orientation of the vehicle, and the raster image may include one or more traffic signal devices that appear in the view, one of which labeled as the primary traffic signal device.

According to various embodiments, the set of coordinates is a set of four coordinates in a two-dimensional plane.

According to various embodiments, the classified real world image further includes one or more sets of coordinates indicating a location of any secondary traffic signal devices in the real world image.

According to various embodiments, in the raster image, any secondary traffic signal devices are each represented by a mask corresponding to a location of the secondary traffic signal device.

According to various embodiments, the computer-readable storage medium further includes one or more programming instructions that, when executed, cause the vehicle to apply a color channel to each mask in the raster image, in which the color channel applied for each mask distinguishes the primary traffic signal device from each of the secondary traffic signal devices.

According to various embodiments, the bounding box indicates a discrete region of pixels in the classified real world image.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value. Also, terms such as "top" and "bottom", "above" and "below", and other terms describing position are intended to have their relative meanings rather than their absolute meanings with respect to ground. For example, one structure may be "above" a second structure if the two structures are side by side and the first structure appears to cover the second structure from the point of view of a viewer (i.e., the viewer could be closer to the first structure).

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, kiosks, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which processing devices and/or memory are shared. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, "electronic communication" refers to the transmission of data via one or more signals between two or more electronic devices, whether through a wired or wireless network, and whether directly or indirectly via one or more intermediary devices. Devices are "communicatively connected" if the devices are able to send and/or receive data via electronic communication.

Figure 1:
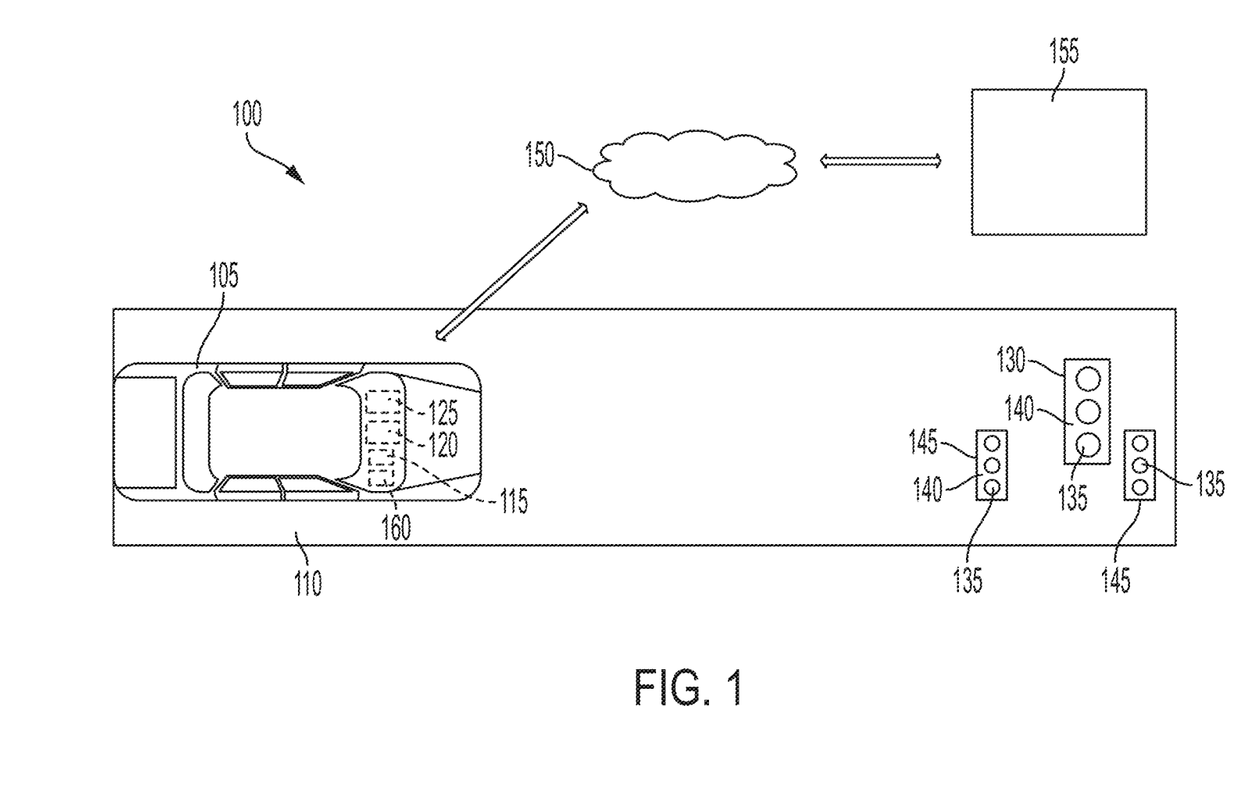
FIG. 1 is an example of a system for identifying and classifying traffic signal devices, in accordance with various embodiments of the present disclosure.

Referring now to FIG. 1, a system 100 for identifying and classifying traffic signal devices 130 is provided.

Traffic signal devices 130, 145 convey driving information to drivers via the one or more signal elements 135 located on the face 140 of the traffic signal devices 130, 145. The traffic signal elements 135 are dynamic in that they can be changed between at least two states to transmit traffic instructions to one or more drivers, and different types of signal elements 135 may be present in a single traffic signal device. Examples of traffic signal elements 135 may include, for example, a red light, a yellow light and a green light. Other examples include lights with directional arrows (such as arrows pointing left or right), other symbols (such as a symbol of a person walking), or words. In each of these examples, each light can be switched between and off state and an on state.

Figure 2:
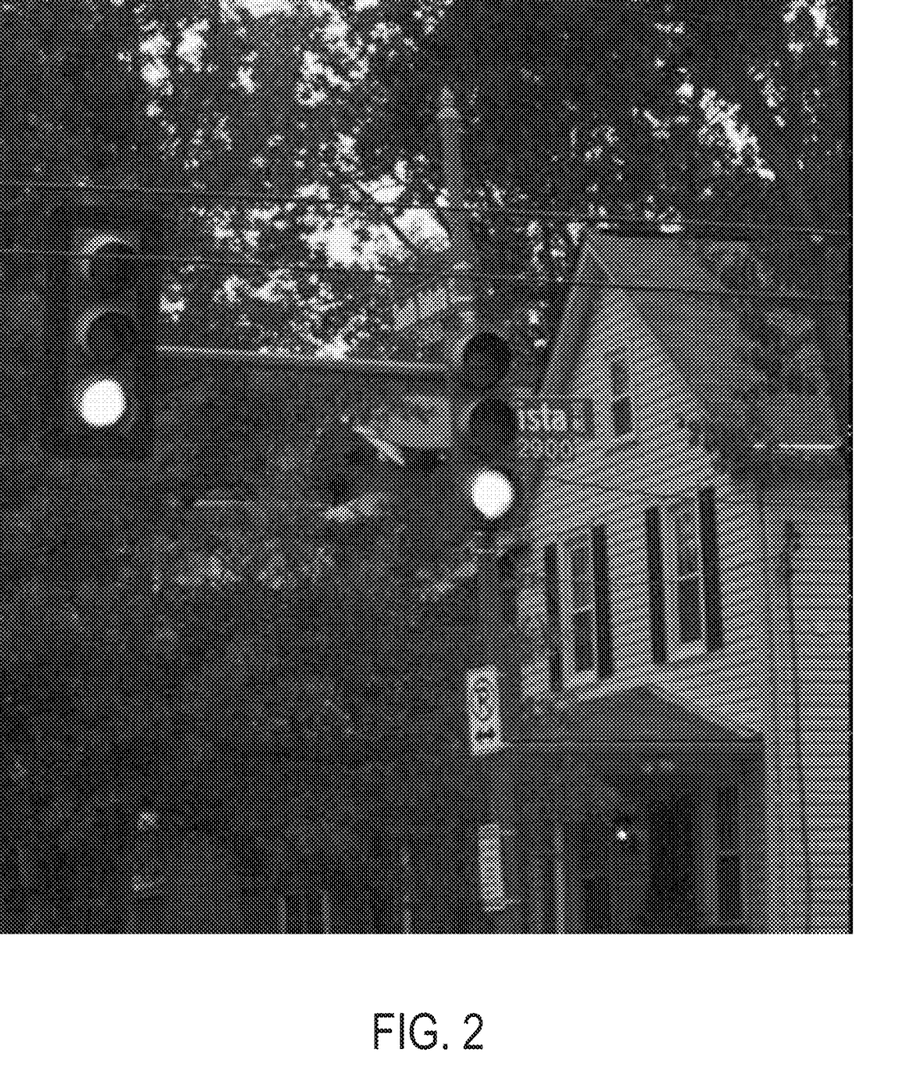
FIG. 2 is an example of an image of various traffic signal devices and the environment around the various traffic signal devices, in accordance with the present disclosure.

It is common for the environment around a traffic signal device 130 to be fairly complicated. For example, multiple types of lighted objects, such as other street lights, crosswalk indicators, and even other traffic signal devices 145, may be in view from a vehicle 105, as shown in the image of multiple traffic signal devices in FIG. 2, which is presented by way of example, showing an instance with multiple traffic signal devices. In order to identify which of these elements is the correct, or primary, traffic signal device, the present disclosure describes a system 100 and means of isolating the correct, or primary, traffic signal device 130.

Traffic signal devices 130, 145 are mapped, and information provided in the mappings of the traffic signal devices includes the three-dimensional location of the face 140 of each of the traffic signal devices 130, 145, the three-dimensional location of the signal elements 135 within each of the faces 140 of the traffic signal devices 130, 145, and the type and color of each signal element 135. This information, combined with the location, orientation, and camera calibrations of the vehicle 105, means that it is possible to know the location and orientation in each camera image of every traffic signal device 130 of interest with moderate certainty.

Figure 3:
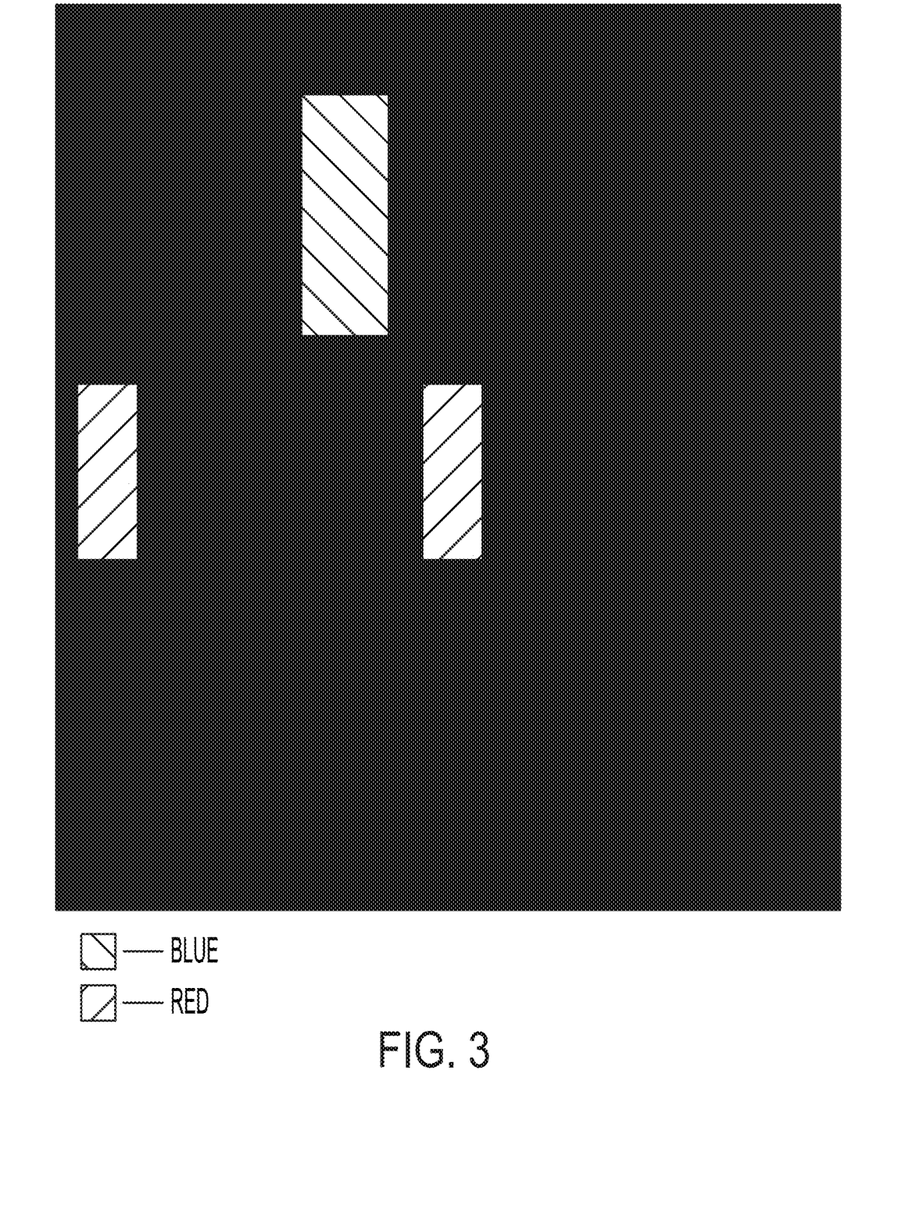
FIG. 3 is an example of a rasterized representation of various traffic signal devices representing the positions of each of the faces of various traffic signal devices, in accordance with the present disclosure.

In the example shown in FIGS. 1 and 3, there are three traffic signal device faces that project into the image in close proximity to one another. In this situation, it is potentially confusing as to which traffic signal device should be classified as the correct, or primary, traffic signal device. However, it is of critical importance for the traffic signal device classifying system 100 to correctly classify the primary traffic signal device 130 face 140, since classification of an incorrect face could result in the vehicle 105 taking the incorrect, and likely unsafe, action.

According to various embodiments, the system 100 includes a vehicle 105. According to various embodiments, the vehicle 105 is traveling on a road 110. It is noted, however, that any suitable path may be implemented.

The vehicle 105 may include a computer vision system 115 configured to receive a digital image of a traffic signal device 130. The computer vision system 115 may include a camera for imaging one or more traffic signal devices 130. The vehicle may include a geographic location system 160 configured to determine a location and orientation of the vehicle 105. The geographic location system 160 may include a Global Positioning System device. It is noted, however, that other forms of geographic location may additionally, or alternatively, be used.

The traffic signal device shown in FIG. 1 includes various signal elements 135, represented as circular lights. However, the features of each of the elements 135 may be any of various element features such as, for example, a green light, a yellow light, a red light, a circular light, a left arrow light, a right arrow light, a forward arrow light, a flashing yellow light, a flashing red light, and/or any other suitable traffic signal element features. It is further noted that the traffic signal device 130 may include any suitable number of signal elements 135, having various positions on the face of the traffic signal device 130. The traffic signal elements 135 correspond to a designated light fixture configured to transmit traffic instructions to one or more drivers. The "real world image" is a digitally captured photograph of a view from the perspective of the vehicle 105.

The vehicle 105 may further include a transceiver 120 configured to send and receive digital information from a remote server 155 via a wired and/or wireless connection such as, for example, through the cloud 150, wherein the vehicle 105 and the remote server 155 are in electronic communication with each other. The vehicle 105 may further include a processor 125. The processor 125 may be configured to receive, using the transceiver 120, information pertaining to features of an environment at the location of the vehicle 105, and use the information and the orientation of the vehicle 105 to generate a raster image of the environment. It is noted that the processor 125 may be a standalone processor 125, the vehicle's 105 processor 125, and/or the remote server's 155 processor 125. Data processed by the processor 125 may be data received from the vehicle 105, received from the remote server 155, and/or a combination of data from the vehicle 105 and the remote server 155. According to various embodiments, the vehicle 105 may include one or more digital storage devices and some or all of the digital information may be stored locally at the vehicle 105.

The processor 125 may be configured to represent the traffic signal device 130 as a raster image (such as that shown in FIG. 3) in which each traffic signal device 130, 145 is represented by a mask corresponding to a location of each traffic signal device 130 in the raster image. According to various embodiments, the raster image is an approximation of a view that will be captured by an image sensor 160 of the vehicle 105 when positioned at the location and orientation of the vehicle 105 and includes one or more traffic signal devices 130, 145 that should appear in the view.

From a traditional object detection perspective in an image, errors pertaining to the confusion between two or more faces is difficult to address because there is relatively little prior known information about the image. However, in regards to traffic signal devices 130, 145, there is a great deal of information known about the location, position, and angle of traffic signal devices 130, 145. Using this information, and given the location and angle of a vehicle 105, it is possible to project every registered and mapped traffic signal device 130, 145 surrounding the vehicle 105 into the coordinate system of the computer vision system to create a rasterized representation of the scene that would be visible to the computer vision system 115 of the vehicle 105.

The raster image forms a template to indicate the layout of a scene which includes various traffic signal devices 130, 145. The raster image indicates the location of each face 140 of the traffic signal devices 130, 145, as a rectangle (although any suitable shape may be used). Each of the faces 140 of the traffic signal devices 130, 145 is represented by a discrete region of pixels. Each discrete region of pixels may be rectangular in shape and/or any other suitable shape. The raster image includes information indicating which of the traffic signal devices 130, 145 in the raster image is the primary traffic signal 130. According to various embodiments, this information is determined using location and orientation information pertaining to the vehicle 105, in addition to any mapping information pertaining to any traffic signal devices mapped in the area in the calculated view of the vehicle 105. It is noted, however, that other data may, in addition or alternatively, be used to determine the primary traffic signal device 130 in the raster image.

As shown in FIG. 3, the raster image forms a template to indicate the layout of a scene which includes various traffic signal devices 130, 145. The raster image shown in FIG. 3 indicates the location of each face 140 of the traffic signal devices 130, 145, as a rectangle (although any shape may be used), and it indicates which face 140 (the face 140 of the primary traffic signal device 130) the network should pay attention to by rendering it with a unique mask. Any secondary traffic signal devices 145 may also be represented with masks. According to various embodiments, the primary traffic signal device 130 and any secondary traffic signal devices 145 are assigned channels applied to their respective masks. According to the embodiment shown in FIG. 3, the primary traffic signal device 130 is assigned to a blue color channel, and the secondary traffic signal devices 145 are assigned to a red color channel, although any suitable channel designation may be used.

According to various embodiments, the real world image and the raster image are provided as inputs to a neural network. According to various embodiments, the real world image and the raster image are compared and the raster image is used as a template to determine which traffic signal device is the primary traffic signal device 130 in the real world image. According to various embodiments, the comparison between the real world image and the raster image is used to determine a set of coordinates in the real world image indicating the position of the primary traffic signal 130 in the real world image. These coordinates may be used to generate a classified real world image in which the primary traffic signal device 130 is represented by a bounding box corresponding to the set of coordinates indicating the position of the primary traffic signal device 130 in the real world image. The set of coordinates may be of any suitable type. For example, the set of coordinates may be a set of four coordinates in a two-dimensional plane.

According to various embodiments, the raster image (as shown in FIG. 3) and a real world image of the scene are provided to the network as inputs and compared in order to determine which portion of the real world image pertains to the primary traffic signal device 130.

According to various embodiments, when the raster image and the real world image are provided to the network as inputs, the images are compared, using the raster image as a template. Matching the real world image to the template, the primary traffic signal device 130 on the real world image is determined, indicating to the network which face should be used to report information pertaining to a state of each element 135 in the primary traffic signal device 130. In addition to identifying the position of each traffic signal device 130, 145 in the image, the raster image may be configured to additionally, or alternatively, provide information pertaining to the relative distance of one or more of the traffic signal devices 130, 145 from the vehicle 105, the states and types of one or more elements of the primary 130 or secondary 145 traffic signal devices, and/or any other suitable information.

Figure 4:
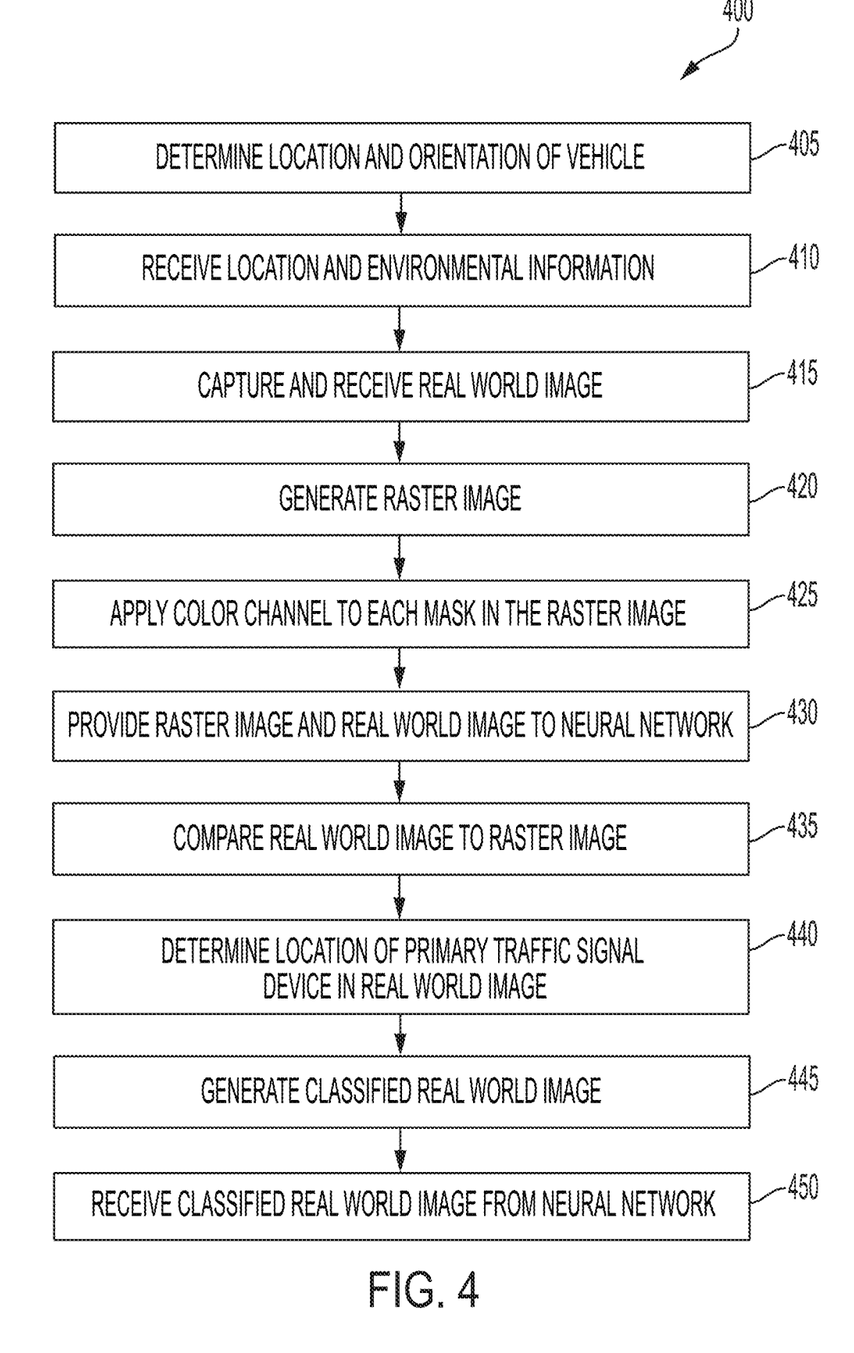
FIG. 4 shows a flowchart of an example of a method for identifying and classifying a traffic signal devices, in accordance with various embodiments of the present disclosure.

Referring now to FIG. 4, a method 400 for identifying and classifying a primary traffic signal device is illustratively depicted.

While driving, a vehicle may come across one or more traffic signal devices. Depending on the location and orientation of the vehicle, one or more traffic signal devices may be in view of the vehicle. At 405, using a geographic location system, a geographic location and an orientation of the vehicle are determined and, at 410, using a processor, information pertaining to features of an environment at the location of the vehicle are received. The information pertaining to the environment may include any mapping information pertaining to any traffic signal devices in view from the vehicle. It is noted that the processor may perform one or more of the steps described herein in method 400.

Using a computer vision system, which includes an image sensor (e.g., a camera, etc.), a real world image of a view from the vehicle is captured and received, at 415. The real world image may include a plurality of traffic signal devices in view from the vehicle.

Using the received information and the orientation of the vehicle, the processor, at 420, generates a raster image of the environment from the viewpoint of a computer vision system of the vehicle. The raster image is an approximation of the view captured by the image sensor of the computer vision system when positioned at the location and orientation of the vehicle, and the raster image may include one or more traffic signal devices that should appear in the view.

At 425, a color channel may applied to each mask in the raster image, in which the color channel applied for each mask distinguishes the primary traffic signal device from each of the secondary traffic signal devices. According to some embodiments, location and classification information pertaining to the traffic signal devices in the raster images, such as which traffic signal device in the raster image is the primary traffic signal device may be provided as input to a neural network. According to some embodiments, a position of a primary traffic signal device and any secondary traffic signal devices may be classified on the raster image, wherein a mask is applied to the primary traffic signal device and any secondary traffic signal devices in the raster image. This information may include environmental and orientation information.

At 430, the real world image and the raster image are provided as input to the neural network, wherein the raster image functions as a template and, at 435, is compared against the real world image in order to determine, at 440, a location of the primary traffic signal device in the real world image. This location may include a set of coordinates indicating the location of the primary traffic signal device in the real world image. These coordinates are then used, at 445, to generate a classified real world image, which may include a bounding box corresponding to the set of coordinates indicating the location of the primary traffic signal device in the real world image. The classified real world image may further include one or more sets of coordinates for any secondary traffic signal devices in the real world image. At 450, the classified real world image is received from the neural network.

Figure 5:
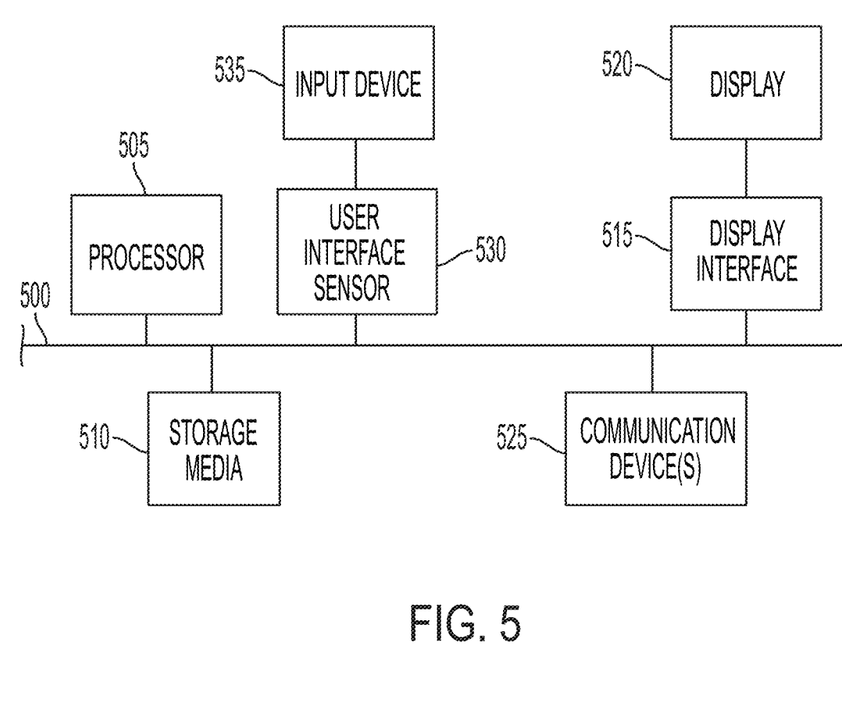
FIG. 5 illustrates a block diagram of example hardware that may be used to contain or implement program instructions according to various embodiments of the present disclosure.

FIG. 5 depicts an example of internal hardware that may be included in any of the electronic components of an electronic device as described in this disclosure such as, for example, an on-premises electronic device, an associate electronic device, a remote electronic device and/or any other integrated system and/or hardware that may be used to contain or implement program instructions. The vehicle described in this disclosure may be an electronic device, including some or all of the components described herein.

A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of a processor as such term is used within this disclosure. Read only memory (ROM) and random access memory (RAM) constitute examples of non-transitory computer-readable storage media 1220, memory devices or data stores as such terms are used within this disclosure.

Program instructions, software or interactive modules for providing the interface and performing any querying or analysis associated with one or more data sets may be stored in the computer-readable storage media 510. Optionally, the program instructions may be stored on a tangible, non-transitory computer-readable medium such as a compact disk, a digital disk, flash memory, a memory card, a USB drive, an optical disc storage medium and/or other recording medium.

An optional display interface 515 may permit information from the bus 500 to be displayed on the display 520 in audio, visual, graphic or alphanumeric format. Communication with external devices may occur using various communication ports 525. A communication port 525 may be attached to a communications network, such as the Internet or an intranet. In various embodiments, communication with external devices may occur via one or more short range communication protocols.

The hardware may also include an interface 530, such as graphical user interface, which allows for receipt of data from input devices such as a keyboard or other input device 535 such as a mouse, a joystick, a touch screen, a remote control, a pointing device, a video input device and/or an audio input device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of representing a traffic signal device in an image, the method comprising:
   by a processor:
   receiving map information that includes one or more traffic signal devices in an environment at a location of a vehicle;
   using the map information and an orientation of the vehicle to generate a raster image of the environment, wherein the raster image includes the one or more traffic signal devices, one of which labeled as a primary traffic signal device; and
   providing a real world image of the environment at the location and the raster image as inputs to a neural network to generate a classified real world image which includes a bounding box indicating a location of the primary traffic signal device.

2. The method of claim 1, wherein the neural network also generates a set of coordinates indicating the location of the primary traffic signal device.

3. The method of claim 2, wherein the set of coordinates comprises four coordinates in a two-dimensional plane.

4. The method of claim 1, wherein the classified real world image further indicates a location of a secondary traffic signal device in the real world image.

5. The method of claim 1, wherein, in the raster image, any secondary traffic signal devices are each represented by a mask corresponding to a location of the secondary traffic signal device.

6. The method of claim 5, further comprising applying a color channel to each mask in the raster image, in which the color channel applied for each mask distinguishes the primary traffic signal device from each of the secondary traffic signal devices.

7. The method of claim 1, wherein the bounding box indicates a discrete region of pixels in the classified real world image.

8. A system for representing a traffic signal device in an image, the comprising:
   a processor;
   a memory storing a neural network; and
   a computer-readable medium storing programming instructions that are configured to instruct the processor to:
   receive map information that includes one or more traffic signal devices in an environment at a location of a vehicle;
   use the map information and an orientation of the vehicle to generate a raster image of the environment, wherein the raster image includes the one or more traffic signal devices, one of which labeled as a primary traffic signal device; and
   provide a real world image of the environment at the location and the raster image as inputs to the neural network to generate a classified real world image which includes a bounding box indicating a location of the primary traffic signal device.

9. The system of claim 8, wherein the neural network is configured to generate a set of coordinates indicating the location of the primary traffic signal device.

10. The system of claim 9, wherein the set of coordinates comprises four coordinates in a two-dimensional plane.

11. The system of claim 8, wherein the classified real world image further indicates a location of a secondary traffic signal device in the real world image.

12. The system of claim 8, wherein, in the raster image, any secondary traffic signal devices are each represented by a mask corresponding to a location of the secondary traffic signal device.

13. The system of claim 12, further comprising additional program instructions that are configured to cause the processor to apply a color channel to each mask in the raster image, in which the color channel applied for each mask distinguishes the primary traffic signal device from each of the secondary traffic signal devices.

14. The system of claim 8, wherein the bounding box indicates a discrete region of pixels in the classified real world image.

15. The system of claim 8, wherein:
the processor is a component of the vehicle; and
the vehicle also comprises a geographic location system configured to receive location data that the processor uses to select the map information.

16. A non-transitory computer-readable medium storing programming instructions that are configured to instruct a processor to representing a traffic signal device in an image by:
receiving map information that includes one or more traffic signal devices in an environment at a location of a vehicle;
using the map information and an orientation of the vehicle to generate a raster image of the environment, wherein the raster image includes the one or more traffic signal devices, one of which labeled as a primary traffic signal device; and
providing a real world image of the environment at the location and the raster image as inputs to a neural network to generate a classified real world image which includes a bounding box indicating a location of the primary traffic signal device.

17. The computer-readable medium of claim 16, wherein the classified real world image further indicates a location of a secondary traffic signal device in the real world image.

18. The computer-readable medium of claim 16, wherein the programming instructions are also configured to cause, in the raster image, any secondary traffic signal devices each be represented by a mask corresponding to a location of the secondary traffic signal device.

19. The computer-readable medium of claim 18, further comprising additional programming instructions that are configured to cause the processor to apply a color channel to each mask in the raster image, in which the color channel applied for each mask distinguishes the primary traffic signal device from each of the secondary traffic signal devices.

20. The computer-readable medium of claim 16, wherein the bounding box indicates a discrete region of pixels in the classified real world image.

* * * * *